(12) United States Patent
Wang et al.

(10) Patent No.: US 11,742,935 B2
(45) Date of Patent: Aug. 29, 2023

(54) CONSTELLATION CONFIGURATION OPTIMIZATION METHOD OF LEO SATELLITE AUGMENTATION SYSTEM FOR ARAIM APPLICATION

(71) Applicant: Beihang University, Beijing (CN)

(72) Inventors: Zhipeng Wang, Beijing (CN); Yanbo Zhu, Beijing (CN); Ziyi Yang, Beijing (CN); Kun Fang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/089,639

(22) Filed: Dec. 28, 2022

(65) Prior Publication Data
US 2023/0137147 A1    May 4, 2023

Related U.S. Application Data

(63) Continuation of application No. PCT/CN2021/090796, filed on Apr. 29, 2021.

(30) Foreign Application Priority Data

Mar. 23, 2021    (CN) .......................... 202110306891.3

(51) Int. Cl.
    *H04B 7/185*     (2006.01)
    *H04B 7/15*     (2006.01)
    (Continued)

(52) U.S. Cl.
    CPC ..... *H04B 7/18521* (2013.01); *H04B 7/18563* (2013.01)

(58) Field of Classification Search
    CPC ...... H04B 7/15; H04B 7/185; H04B 7/18521; H04B 7/18563; G01S 19/13; G01S 19/20;
    (Continued)

(56) References Cited

U.S. PATENT DOCUMENTS

6,281,836 B1 *   8/2001   Lupash ................. G01C 21/24
                                                  342/357.58
9,784,844 B2 *   10/2017   Kana ...................... G01S 19/20
(Continued)

FOREIGN PATENT DOCUMENTS

CN     107329146 A     11/2017
CN     107798187 A     3/2018
(Continued)

OTHER PUBLICATIONS

International Search Report of PCT/CN2021/090796, dated Nov. 25, 2021.

*Primary Examiner* — Blane J Jackson
(74) *Attorney, Agent, or Firm* — Locke Lord LLP; Tim Tingkang Xia, Esq.

(57) ABSTRACT

A constellation configuration optimization method of a low earth orbit (LEO) satellite augmentation system for an ARAIM application includes: 1, traversing vertical protection levels after all subset solutions and fault modes under the condition that integrity risk and continuity risk are equally distributed, and determining the constraint conditions of LEO satellite constellation configuration parameters; 2, determining objective functions of LEO satellite constellation configuration parameters $x_1$, $x_2$, $x_3$, $x_4$, eliminating calculated values of abnormal vertical protection levels, and screening initial populations of the parameters $x_1$, $x_2$, $x_3$, $x_4$; 3, calculating fitness of the objective functions; 4, starting from a second generation population, merging a parent population with an offspring population to form a new offspring population; 5, performing local optimal selection on the new offspring population, screening out a maximum value of the objective functions as an optimal offspring, and repeating step 4 until a genetic algebra is less than a maximum genetic algebra.

10 Claims, 3 Drawing Sheets

(51) Int. Cl.
*G01S 19/42* (2010.01)
*G01S 19/31* (2010.01)

(58) Field of Classification Search
CPC .......... G01S 19/25; G01S 19/38; G01S 19/39; G01S 19/42
See application file for complete search history.

(56) References Cited

U.S. PATENT DOCUMENTS

| | | | |
|---|---|---|---|
| 9,958,551 B1* | 5/2018 | Wang | G01S 19/15 |
| 10,197,678 B1* | 2/2019 | Wang | G01S 19/20 |
| 10,422,882 B1* | 9/2019 | Wang | G06F 17/18 |
| 10,436,912 B1* | 10/2019 | Wang | G06F 17/16 |
| 11,226,416 B1* | 1/2022 | Pullen | G01S 19/07 |
| 2010/0033370 A1* | 2/2010 | Lopez | G01S 19/20 |
| | | | 342/357.29 |
| 2014/0292574 A1* | 10/2014 | Dunik | G01S 19/20 |
| | | | 342/357.58 |
| 2020/0348422 A1 | 11/2020 | Carcanague et al. | |
| 2021/0072407 A1* | 3/2021 | Talbot | G01S 19/44 |
| 2021/0239855 A1* | 8/2021 | Mu | G01S 19/073 |
| 2021/0405208 A1* | 12/2021 | Cypriano | G01S 19/15 |

FOREIGN PATENT DOCUMENTS

| | | |
|---|---|---|
| CN | 109061683 A | 12/2018 |
| CN | 109635332 A | 4/2019 |
| CN | 111708054 A | 9/2020 |

* cited by examiner

CONSTELLATION CONFIGURATION OPTIMIZATION METHOD OF LEO SATELLITE AUGMENTATION SYSTEM FOR ARAIM APPLICATION

CROSS-REFERENCE TO RELATED APPLICATION

This application is a continuation application of International Patent Application No. PCT/CN2021/090796, filed on Apr. 29, 2021, which itself claims priority to and benefit of Chinese Patent Application No. 202110306891.3 filed on Mar. 23, 2021 in the State Intellectual Property Office of P. R. China. The disclosure of each of the above applications is incorporated herein by reference in its entirety.

TECHNICAL FIELD

The present invention relates to the technical field of satellite navigation, in particular to a constellation configuration optimization method of a low earth orbit (LEO) satellite augmentation system for an ARAIM application.

BACKGROUND ART

A Global Navigation Satellite System (GNSS) has developed rapidly and has been widely used in various fields. In the future, mass users all over the world have put forward a series of requirements for high precision, fast convergence, high integrity, high security and high availability, so high-security real-time precise positioning in complex environment has become a higher goal of GNSS at present. In order to solve the above problems, all countries are actively building their own navigation enhancement systems, while the traditional navigation enhancement systems are all working systems of ground station auxiliary information enhancement. However, due to the limitation of our country's territory and territory, it is difficult to realize global centimeter-level positioning and fast convergence service by setting up global ground stations. Therefore, with the increasing demand of station density and information rate, the existing augmentation system can't support the next generation Beidou to realize centimeter-level real-time positioning service in challenging environment. Therefore, it is necessary to design the architecture and system of a new enhanced system to achieve three goals: 1) to reduce the dependence on overseas stations; 2) to expand enhanced services from regional enhancement to global enhancement; 3) to greatly improve the usability and security of precision positioning services.

With the development of communication services, at the end of the 20th century, LEO satellite constellations for mobile communication appeared, and the typical representatives are Iridium and Globalstar constellations in the United States. In January 2019, the second generation iridium system completed networking, completely replacing the first generation iridium system. In addition to the original communication service, the new generation Iridium satellite system is equipped with navigation enhanced payload, which can provide users with other services besides communication, such as positioning and tracking, broadcast automatic correlation monitoring and so on. Since 2015, many internationally renowned companies, such as OneWeb, SpaceX, Boeing of the United States, Samsung of South Korea, Aerospace Science and Technology Group of China and Aerospace Science and Technology Group, have successively announced the launch and deployment of their commercial LEO constellations, all in order to provide seamless and stable broadband Internet communication services to the world. The first star of China's "Hongyan" constellation was successfully launched on Dec. 29, 2018 and entered the scheduled orbit. The whole constellation is planned to be deployed around 2024. Hongyan Mobile Communication Constellation not only meets the needs of multi-field monitoring data information transmission, but also has the mobile broadcasting function, is equipped with onboard GNSS receiver, and is equipped with navigation enhancement function.

Because of the rapid development of LEO satellite market and the low cost of carrying navigation enhancement payload, it can be used as a space-based monitoring platform to realize a new navigation enhancement system of "space-based monitoring+signal enhancement". The opening of Beidou-3 marks the official completion of the meter-level navigation and positioning system comparable to GPS in China. For the future development of Beidou, Ran Chengqi, deputy chief designer of Beidou satellite navigation system engineering, said that it is expected to be referred to as the space-based low-orbit constellation system for short before 2025, and provide centimeter-level positioning services to the whole world.

At present, the research on LEO navigation enhancement mainly focuses on real-time precise orbit determination and remote sensing monitoring. There is a lack of integrity monitoring of LEO satellite navigation enhancement system, and once LEO satellite navigation system is officially used for navigation enhancement service, it will affect the availability of ARAIM airborne receiver.

Therefore, in order to overcome the problems in the prior art, a constellation configuration optimization method of a LEO satellite augmentation system for an ARAIM application is needed.

SUMMARY

An object of the present invention is to provide a constellation configuration optimization method of a LEO satellite augmentation system for an ARAIM application, which includes the following steps:

1, traversing vertical protection levels after all subset solutions and fault modes under the condition that integrity risk and continuity risk are equally distributed, and determining the constraint conditions of LEO satellite constellation configuration parameters;

2, determining objective functions of LEO satellite constellation configuration parameters $x_1$, $x_2$, $x_3$, $x_4$, eliminating calculated values of abnormal vertical protection levels, and screening initial populations of the parameters $x_1$, $x_2$, $x_3$, $x_4$;

3, calculating fitness of the objective functions of the LEO satellite constellation configuration parameters $x_1$, $x_2$, $x_3$, $x_4$;

4, after screening out an initial population of the parameters $x_1$, $x_2$, $x_3$, $x_4$, starting from a second generation population, merging a parent population and an offspring population to form a new offspring population, and performing fast non-dominated sorting, calculating crowding degrees of individuals in each non-dominated layer, randomly paring the individuals, and performing a crossover operation of a genetic algorithm between the paired two individuals;

5, after the parent population and the offspring population are merged to form the new offspring population, implementing optimal preservation strategy and local optimal selection for the new offspring population, and selecting a maximum value of the objective functions as an optimal offspring, and repeating step 4 until a genetic algebra is less than a maximum genetic algebra.

Preferably, the vertical protection level in step 1 is expressed as:

$VPL_q = \max((VPL_0)_q, \max((VPL_i)_q))$, where $VPL_0$ is a vertical protection level under a fault-free condition, $(VPL_0)_q = K_{MD,q}^0 \cdot \sigma_{0,q} + \Sigma_{n=1}^{Nsat} |S_{q,n}^0| \cdot b_{int,n}$, $K_{MD,q}^0$ is an integrity and continuity risk value of the fault-free mode under a fully visible satellite subset, $S_{q,n}^0$, is a projection matrix, and $b_{int,n}$ is a maximum nominal deviation of a $n^{th}$ satellite;

$VPL_i$ is a vertical protection level corresponding to a measurement deviation of an $i^{th}$ fault mode where a maximum deviation is not exceeded, $(VPL_i)_q = K_{MD,q}^i \cdot \sigma_{i,q} + \Sigma_{n=1}^{Nsat} |S_{q,n}^i| \cdot b_{int,n} + D_{i,q}$, $D_{i,q}$ is a detection threshold;

wherein, $\sigma_{0,q} = \sqrt{(GW_{INT}G^T)_{q,q}^{-1}}$, $\sigma_{i,q} = \sqrt{(G^T M_i W_{INT} G^T)_{q,q}^{-1}}$, G is a geometric matrix in a pseudo-range observation equation, $W_{INT}$ is a parameter of a fixed error hypothesis model related to integrity, $M_i$ is an identity matrix of a size $N_{sat}*N_{sat}$, $N_{sat}$ is the number of visible satellites, and q is a $q^{th}$ sample point;

the geometric matrix G in the pseudo-range observation equation contains the LEO satellite constellation configuration parameters $x_1$, $x_2$, $x_3$, $x_4$;

the constraint conditions of the LEO satellite constellation configuration parameters are expressed as:

$$\begin{bmatrix} N_0 & 0 \\ N_C & N_{SO} \end{bmatrix} \begin{bmatrix} \Omega_{ij} & \Omega_{11} \\ M_{ij} & M_{11} \end{bmatrix} = 2^\pi \begin{bmatrix} i & -1 \\ j & -1 \end{bmatrix},$$

where $N_0$ is the number of orbital planes of LEO constellation, $N_{SO}$ is the number of satellites on each orbital plane, $N_C$ is a phase parameter, $N_C \in [1, N_0]$. $\Omega$ is a right ascension of an ascending intersection point, M is an average anomaly, where i represents an $i^{th}$ orbital plane and j represents $j^{th}$ satellite.

Preferably, the objective functions of the LEO satellite constellation configuration parameters $x_1$, $x_2$, $x_3$, $x_4$ in step 2 are expressed as:

$\begin{cases} \min[-F_{VPL}(x_1)] \\ \text{s.t. } 0 \leq x_1 \leq \frac{\pi}{2} \end{cases}$, $\begin{cases} \min[-F_{VPL}(x_2)] \\ \text{s.t. } 800 \leq x_2 \leq 2000 \end{cases}$, $\begin{cases} \min[-F_{VPL}(x_3)] \\ \text{s.t. } 0 \leq x_3 \leq 0.782 \end{cases}$, $\begin{cases} \min[-F_{VPL}(x_4)] \\ \text{s.t. } 0 \leq x_4 \leq 0.3 \end{cases}$, wherein, $F_{VPL}(x_1)$ is a function where a vertical protection level VPL is the parameter $x_1$, $F_{VPL}(x_2)$ is a function where a vertical protection level VPL is the parameter $x_2$, $F_{VPL}(x_3)$ is a function where a vertical protection level VPL is the parameter $x_3$, and $F_{VPL}(x_4)$ is a function where a vertical protection level VPL is the parameter $x_4$.

Preferably, in step 2, the calculated values of abnormal vertical protection levels are eliminated by the following method:

initial anomaly detection thresholds are set to $T_{first}^+$, $T_{first}^-$, and $T_{first}^+ = \mu_{all} + 2\sigma_{all}$, $T_{first}^- = \mu_{all} - 2\sigma_{all}$ is defined, where $\mu_{all}$ is an average value of VPL calculated values of vertical protection levels corresponding to all sample points, and $\sigma_{all}$ is a standard deviation of vertical protection and VPL calculated values corresponding to all sample points, the calculated value of the vertical protection level VPL of each sample point is compared with $T_{first}^+$, $T_{first}^-$, and if the inequality $T_{first}^+ \leq VPL \leq T_{first}^-$ is satisfied, the sample point passes the threshold detection and waits for the initial population screening; if the inequality $T_{first}^+ \leq VPL \leq T_{first}^-$ is not satisfied, the sample point fails the threshold detection and is stored in a abnormal data module.

Preferably, in step 2, the initial population screening is carried out by the following method:

for an orbit inclination parameter $x_1$, a sampling interval is set to 0.01, and a total of 158 sample points are generated; a set of data is taken every 9 sample points as a sample of the initial population, and the 15 samples constitute the initial population of the orbit inclination parameter $x_1$;

for an orbit height parameter $x_2$, a sampling interval is set to 1, and a total of 1200 sample points are generated; a set of data is taken every 19 sample points as a sample of the initial population, and the 60 samples form the initial population of the orbit inclination parameter $x_2$;

for an initial value parameter $x_3$ of ascending intersection right ascension, a sampling interval is set to 0.001, and a total of 79 sample points are generated; a set of data is taken every four sample points as a sample of the initial population, and the 15 samples constitute the initial population of the orbit inclination parameter $x_3$;

for an initial value parameter $x_4$ of mean anomaly, a sampling interval is set to 0.01, and a total of 30 sample points are generated; a set of data is taken every four sample points as a sample of the initial population, and the six samples constitute the initial population of the orbit inclination parameter $x_4$.

Preferably, in step 3, the fitness of the objective functions of the LEO satellite constellation configuration parameters $x_1$, $x_2$, $x_3$, $x_4$ is calculated by the following method:

a maximum optimization problem function is adopted for a fitness function:

$$\text{Fitness } (F_{VPL}(x)) = \begin{cases} F_{VPL}(x) + C_{min}, & C_{min} + F_{VPL}(x) > 0 \\ 0, & C_{min} + F_{VPL}(x) \leq 0 \end{cases},$$

where $C_{min}$ is a preset number, and the minimum function value of the objective function $F_{VPL}(x)$ estimated so far is taken as the objective function, $F_{VPL}(x)$ is an objective function, representing a function where the vertical protection level VPL is the parameter $x_1$, $x_2$, $x_3$ or $x_4$.

Preferably, the objective function should also satisfy the following conditions:

the value of the objective function is $\leq 35$ m.

Preferably, the merging ratio of the parent population and the offspring population to form the new offspring population is:

$$pro_i = \frac{\left|\frac{X_{ul} - X_{ll}}{\Delta \pi_i}\right|}{2(N_{interval} + 1)}, i = 1, 2, 3, 4,$$

where $X_{ul}$ is an upper limit of an optimization parameter range, $X_{ll}$ is a lower limit of the optimization parameter range, $\Delta \tau_i$ is an sampling interval of each parameter, and $N_{interval}$ is a sample interval when the initial population is generated.

Preferably, in step 5, a local mean $A_m^n$ of the sample is introduced for local optimal selection, a selection threshold $T_{sel}$ is set, and after performing the optimal preservation strategy selection for the new offspring population, a difference between the objective function and each local mean $A_m^n$ is calculated, if the difference is greater than the selection threshold $T_{sel}$, the local optimal test is passed, and the maximum value of the objective function is taken as the optimal offspring; if the difference is less than the threshold $T_{sel}$, the maximum value near the objective function will be searched as the optimal offspring.

10. The method according to claim 9, wherein the local mean $A_m^n$ of the sample is expressed as:

$$A_m^n = \frac{\sum_{5n+1}^{5(n+1)} x_i}{k} \left( n = 0, 1, 2, 3, \ldots, m = 1, 2, 3, \ldots, \left[\frac{\left[\frac{X_{ul} - X_{ll}}{\Delta \pi_i}\right]}{5}\right]\right),$$

where m represents the $m^{th}$ local mean value, the maximum value is $$\left[\frac{\left[\frac{X_{ul} - X_{ll}}{\Delta \pi_i}\right]}{5}\right],$$

and $x_i$ represents the $i^{th}$ sample of the corresponding parameter, it is stipulated that the average value of every five samples is taken as the local mean value, $X_{ul}$ is an upper limit of the optimization parameter range, $X_{ll}$ is a lower limit of the optimization parameter range, and $\Delta \tau_i$ is a $X_{ul}$ sampling interval of each parameter.

According to the present situation of LEO navigation enhancement, the present invention provides a constellation configuration optimization method suitable for a LEO satellite navigation enhancement system, and a constellation configuration optimization method based on an ARAIM protection level algorithm is proposed by combining the non-dominated sorting genetic algorithm with elite strategy. The ARAIM protection level algorithm optimization is realized from another angle through operations such as abnormal data elimination and parameter sampling, which makes up for the integrity monitoring vacancy of LEO satellite navigation enhancement system and provides reference for future LEO satellite navigation system design and networking.

According to the method, the parameters to be optimized are determined by the ARAIM protection level formula, and the specific observation matrix to be optimized is obtained after the risk values are evenly distributed; Define the constraint range of the optimization parameters in the observation matrix, and optimize the objective function within the constraint range; before optimization, abnormal data detection and data sampling are carried out to screen the initial population, and when the parent and offspring populations are merged, a specific proportion is adopted to merge them purposefully; Finally, in order to avoid local optimization, the local mean of the sample is defined, and the optimized value and the local mean are threshold-tested, so as to achieve the goal of global optimization.

It should be understood that the foregoing general description and the following detailed description are exemplary illustrations and explanations, and should not be used as limitations on the claimed contents of the present invention.

BRIEF DESCRIPTION OF THE DRAWINGS

Further objects, functions and advantages of the present invention will be clarified by the following description of embodiments of the present invention with reference to the accompanying drawings, in which.

DETAILED DESCRIPTION

Figure 1:
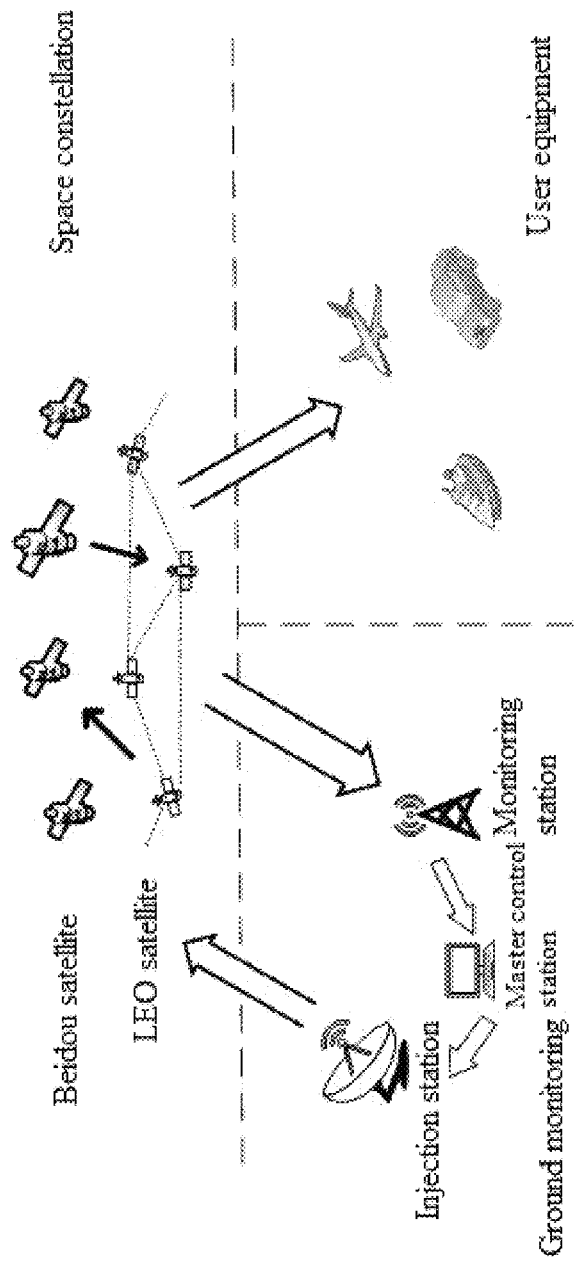
FIG. 1 schematically shows the spatial schematic diagram of the LEO enhanced ARAIM system of the present invention.

With reference to exemplary embodiments, the objects and functions of the present invention and the methods for realizing them will be clarified. However, the present invention is not limited to the following disclosed exemplary embodiments; It can be implemented in different forms. The essence of the description is only to help those skilled in relevant fields to comprehensively understand the specific details of the present invention.

Hereinafter, embodiments of the present invention will be described with reference to the accompanying drawings. In the drawings, the same reference numerals represent the same or similar parts or the same or similar steps.

Advanced Receiver Autonomous Integrity Monitor (ARAIM) is an important technology in satellite navigation integrity monitoring. If there is any fault in the airborne terminal, it can alert the user in time, without building a large number of ground infrastructure. Its application is convenient and quick, and it can be quickly popularized.

In order to solve the problems existing in the prior art, the present invention aims to improve the availability of ARAIM of the Beidou satellite navigation system, and reduce its protection level by introducing LEO satellite navigation system. The present invention selects the optimal LEO constellation configuration for different parameters by using non-dominated sorting genetic algorithm with elite strategy, so as to improve the availability of an ARAIM airborne receiver.

In order to explain the present invention more clearly, firstly, the LEO satellite system is briefly described. As shown in FIG. 1, the LEO enhanced ARAIM system of the present invention is a spatial schematic diagram. The LEO satellite system is equipped with an onboard GNSS receiver, which generates a signal with the same time-frequency as the Beidou satellite navigation system, and broadcasts it to the ground through the onboard navigation load. After receiving the communication navigation signal, the ground monitoring station transmits it to the main control station, and the main control station determines the orbit information of the LEO satellite after calculation, and uploads it to the LEO satellite through the uplink of the injection station. At this time, the LEO satellite can download the ephemeris containing the orbit information to the user terminal through the downlink, and the user terminal (the airborne terminal) can optimize the constellation configuration of the LEO satellite augmentation system by using this information to solve the problem with an algorithm.

Figure 2:
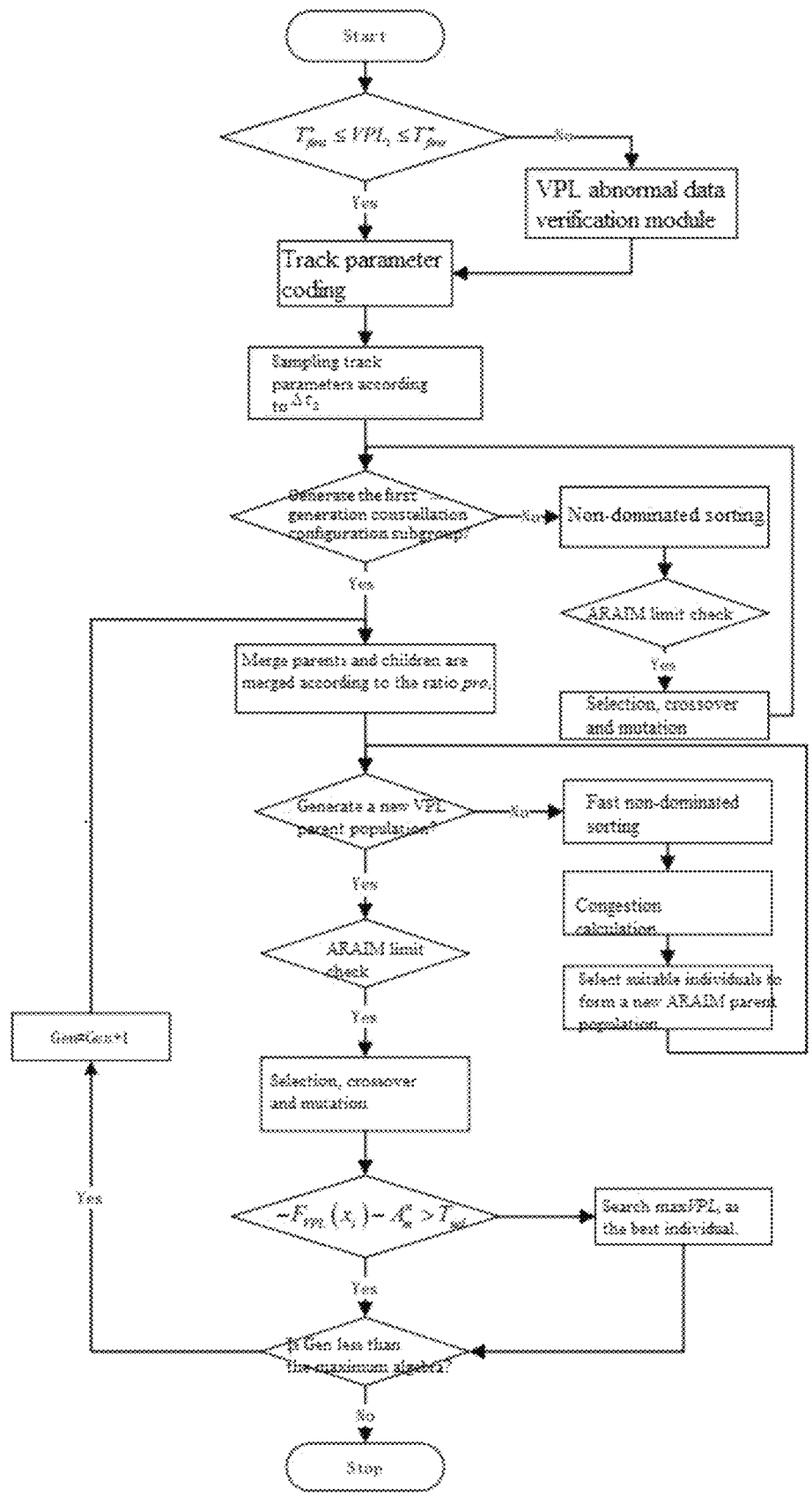
FIG. 2 shows the algorithm flow chart of constellation configuration optimization method of LEO augmentation system for ARAIM application.

FIG. 2 shows the algorithm flow chart of the constellation configuration optimization method of a LEO augmentation system for an ARAIM application of the present invention. According to the embodiment of the present invention, a constellation configuration optimization method of LEO satellite augmentation system for ARAIM application includes the following steps:

1. Traversing vertical protection levels after all subset solutions and fault modes under the condition that integrity risk and continuity risk are equally distributed, and determining the constraint conditions of LEO satellite constellation configuration parameters;

After the ephemeris data of LEO satellite and Beidou navigation satellite are input into the user algorithm of Multiple Hypothesis Solution Separation (MHSS) of ARAIM, the satellite position information is output according to the satellite almanac, and then the user grid point position information is read, and the visible stars are compared with the shielding angle standard. According to the preset error model and fault mode, the fully visible satellite solution and the subset solution of each fault mode are calculated. After the threshold test of separation, the horizontal/vertical protection level and effective monitoring threshold are calculated, so as to evaluate the state of the constellation. In the basic MHSS ARAIM protection level calculation, the vertical protection value (VPL) less than 35 m is the key index to evaluate the usability, and the VPL value of this grid point is calculated by the maximum function.

According to the embodiment of the present invention, under the condition that the integrity risk and continuity risk are equally distributed, the vertical protection level after traversing all subset solutions and fault modes is expressed as:

$VPL_q = \max((VPL_0)_q, \max((VPL_i)_q))$, where $VPL_0$ is a vertical protection level under a fault-free condition, $(VPL_0)_q = K_{MD,q}^0 \cdot \sigma_{0,q} + \Sigma_{n=1}^{Nsat} |S_{q,n}^0| \cdot b_{int,n}$, $K_{MD,q}^0$ is an integrity and continuity risk value of the fault-free mode under a fully visible satellite subset, $S_{q,n}^0$, is a projection matrix, and $b_{int,n}$ is a maximum nominal deviation of a $n^{th}$ satellite;

$VPL_i$ is a vertical protection level corresponding to a measurement deviation of an $i^{th}$ fault mode where a maximum deviation is not exceeded, $(VPL_i)_q = K_{MD,q}^i \cdot \sigma_{i,q} + \Sigma_{n=1}^{Nsat} |S_{q,n}^i| \cdot b_{int,n} + D_{i,q}$, $D_{i,q}$ is a detection threshold;

wherein , $\sigma_{0,q} = \sqrt{(GW_{INT}G^T)_{q,q}^{-1}}$, $\sigma_{i,q} = \sqrt{(G^T M_i W_{INT} G^T)_{q,q}^{-1}}$, G is a geometric matrix in a pseudo-range observation equation, $W_{INT}$ is a parameter of a fixed error hypothesis model related to integrity, $M_i$ is an identity matrix of a size $N_{sat} * N_{sat}$, $N_{sat}$ is the number of visible satellites, and q is a $q^{th}$ sample point;

the geometric matrix G in the pseudo-range observation equation contains the LEO satellite constellation configuration parameters $x_1$, $x_2$, $x_3$, $x_4$, in which the parameter $x_1$ is the orbit inclination, the parameter $x_2$ is the orbit altitude, the parameter $x_3$ is the starting value parameter of ascending intersection right ascension, and the parameter $x_4$ is the starting value of mean anomaly.

According to the present invention, the constellation configuration of the LEO augmentation system is optimized, and finally the maximum VPL is optimized to achieve the purpose of reducing the protection level. Because the protection level is optimized to the maximum value, the protection level is optimized by reducing the integrity and continuity risk value or optimizing the observation matrix and error parameters.

In the optimization process, the vertical protection level VPL is a function of the LEO constellation configuration parameter $x_1$, $x_2$, $x_3$, $x_4$, that is, the objective function in step 2 below. Therefore, the configuration of Low Earth Orbit LEO should be defined first. Combining with the actual launch cost, this invention selects the Walker configuration in two dimensional Lattice Flower Constellation (2D-LFC), which is a special case of 2D-LFC. 2D-LFC can define the orbit of a satellite with nine parameters, six of which are Kepler elements.

According to the present invention, the constraint conditions of LEO satellite constellation configuration parameters are determined, and a 2D-LFC constellation configuration will satisfy the following constraints:

$$\begin{bmatrix} N_0 & 0 \\ N_C & N_{SO} \end{bmatrix} \begin{bmatrix} \Omega_{ij} & \Omega_{11} \\ M_{ij} & M_{11} \end{bmatrix} = 2\pi \begin{bmatrix} i & -1 \\ j & -1 \end{bmatrix},$$

where $N_0$ is the number of orbital planes of LEO constellation, $N_{SO}$ is the number of satellites on each orbital plane, $N_C$, is a phase parameter, $N_C \in [1, N_0]$. $\Omega$ is a right ascension of an ascending intersection point, M is an average anomaly, where i represents an $i^{th}$ orbital plane and j represents a $j^{th}$ satellite.

Considering the external constraints, the four parameters should be constrained within a certain range, as shown in Table 1.

TABLE 1

LEO constellation optimization parameters

| Parameter | Range |
| --- | --- |
| $x_1$ orbit inclination (rad) | 0-π/2 |
| $x_2$ orbit height (km) | 800-2000 |
| $x_3$ starting value of ascending intersection right ascension (rad) | 0-0.782 |
| $x_4$ starting value of mean anomaly (rad) | 0-0.3 |

Step 2, determining objective functions of LEO satellite constellation configuration parameters $x_1$, $x_2$, $x_3$, $x_4$, eliminating calculated values of abnormal vertical protection levels, and screening initial populations of the parameters $x_1$, $x_2$, $x_3$, $x_4$;

where the parameter $x_1$ is the orbit inclination, the parameter $x_2$ is the orbit altitude, the parameter $x_3$ is the starting value parameter of ascending intersection right ascension, and the parameter $x_4$ is the starting value of mean anomaly.

Determine the Objective Function

As this invention is a multiple objective optimization problem (MOOP), which is discussed based on pareto optimal solution, the screening of the initial population is particularly critical when using the Elitist Nondominated Sorting Genetic Algorithm (NSGA-II) method.

Firstly, the MOOP is transformed into a simple objective optimization problem (SOOP), and the objective functions of the four optimization parameters are listed as follows:

$$\begin{cases} \min[-F_{VPL}(x_1)] \\ \text{s.t. } 0 \leq x_1 \leq \dfrac{\pi}{2} \end{cases},$$

$$\begin{cases} \min[-F_{VPL}(x_2)] \\ \text{s.t. } 800 \leq x_2 \leq 2000 \end{cases},$$

-continued $$\begin{cases} \min[-F_{VPL}(x_3)] \\ \text{s.t. } 0 \le x_3 \le 0.782 \end{cases},$$

$$\begin{cases} \min[-F_{VPL}(x_4)] \\ \text{s.t. } 0 \le x_4 \le 0.3 \end{cases},$$

In mathematical processing, the minimization of the maximum value means $\min(\max((VPL_0)_q, \max((VPL_i)_q)))$; because it is inconvenient for mathematical calculation, the formula takes two negative signs, and the original optimization objective is transformed into:

$$-\min[-\max((VPL_0)_q, \max((VPL_i)_q))].$$

Then the objective functions corresponding to the four LEO satellite constellation configuration parameters $x_1$, $x_2$, $x_3$, $x_4$ are described as:

$$\begin{cases} \min[-F_{VPL}(x_1)] \\ \text{s.t. } 0 \le x_1 \le \frac{\pi}{2} \end{cases},$$

$$\begin{cases} \min[-F_{VPL}(x_3)] \\ \text{s.t. } 800 \le x_2 \le 2000 \end{cases},$$

$$\begin{cases} \min[-F_{VPL}(x_3)] \\ \text{s.t. } 0 \le x_3 \le 0.782 \end{cases},$$

$$\begin{cases} \min[-F_{VPL}(x_4)] \\ \text{s.t. } 0 \le x_4 \le 0.3 \end{cases}$$

where $F_{VPL}(x_1)$ is a function where a vertical protection level VPL is the parameter $x_1$, $F_{VPL}(x_2)$ is a function where a vertical protection level VPL is the parameter $x_2$, $F_{VPL}(X_3)$ is a function where a vertical protection level VPL is the parameter $x_3$, and $F_{VPL}(x_4)$ is a function where a vertical protection level VPL is the parameter $x_4$.

Eliminate the Calculated Values of Abnormal Vertical Protection Level

Due to satellite interruption, ephemeris calculation error, false alarm and other reasons, it is possible that the calculated value of individual VPL is quite different from the real value, and such VPL value cannot normally participate in the optimization calculation. Therefore, the first task is to eliminate these outliers.

Figure 3:
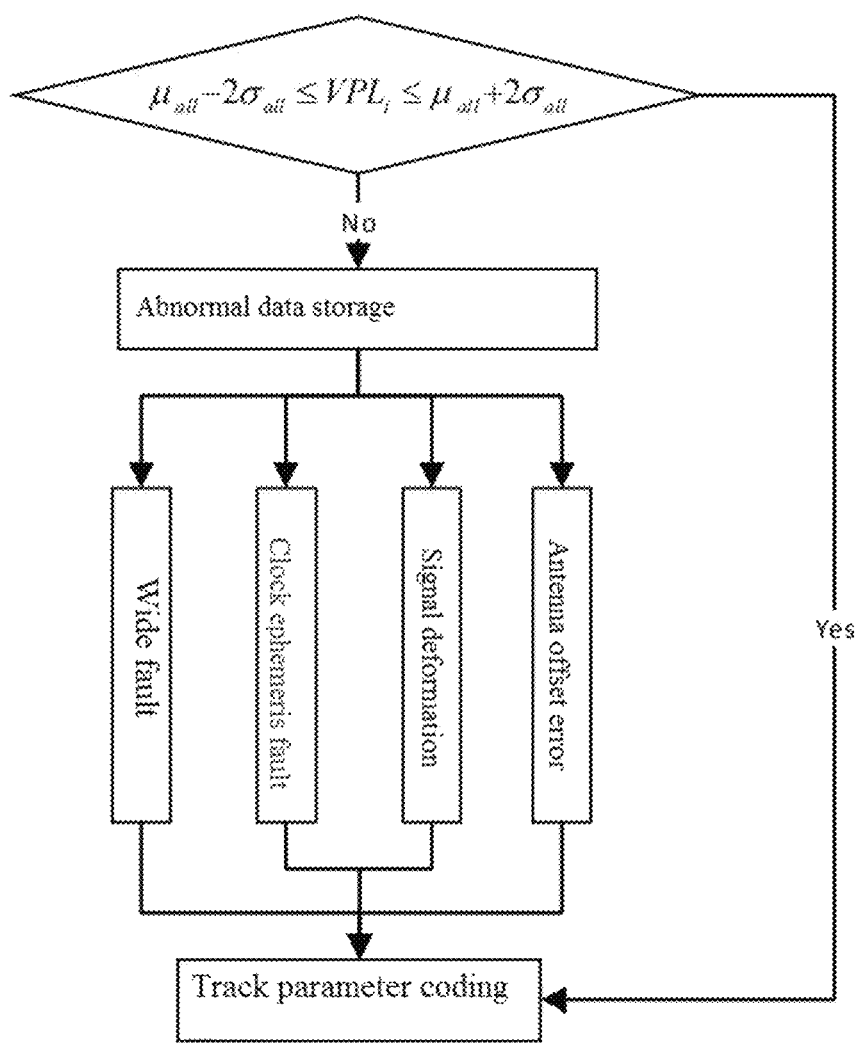
FIG. 3 shows an initial anomaly verification diagram of the vertical protection level.

According to the embodiment of the present invention, as shown in the initial abnormal verification diagram of the vertical protection level in FIG. 3, the calculated value of the abnormal vertical protection level is eliminated by the following method:

According to VPL, initial anomaly detection thresholds $T_{first}^+$, $T_{first}^-$ are set, and $T_{first}^+ = \mu_{all} + 2\sigma_{all}$, $T_{first}^- = \mu_{all} - 2\sigma_{all}$ are defined, wherein, $\mu_{all}$ is an average value of VPL calculated values of vertical protection levels corresponding to all sample points, and $\sigma_{all}$ is a standard deviation of vertical protection and VPL calculated values corresponding to all sample points;

the calculated value of the vertical protection level VPL of each sample point is compared with $T_{first}^+$, $T_{first}^-$, and if the inequality $T_{first}^+ \le VPL \le T_{first}^-$ is satisfied, the sample point passes the threshold detection and waits for the initial population screening; if the inequality $T_{first}^+ \le VPL \le T_{first}^-$ is not satisfied, the sample point fails the threshold detection and is stored in a abnormal data module.

The failed data will be verified separately after the whole data flow, traversing all abnormal reasons, such as constellation width fault, clock ephemeris fault, signal distortion, antenna offset error, etc. If there is no match, it will be added to the initial population.

Screening Initial Population

Because the selection of initial population is the basis of genetic algorithm, the selection strategy of initial population is very important. The original random construction mode is based on a huge sample size, but the configuration parameters $x_1$, $x_3$, $x_4$ of the LEO constellation of the present invention only need to be accurate to two or three decimal places, and $x_2$ only needs to be accurate to one digit, otherwise, many unnecessary calculation loads will be increased. In view of this background, the present invention proposes a data initial population screening strategy based on sampling aiming at the above four parameters.

According to the embodiment of the present invention, the initial population screening is carried out by the following method:

for an orbit inclination parameter $x_1$, a sampling interval is set to 0.01, and a total of 158 sample points are generated; a set of data is taken every 9 sample points as a sample of the initial population, and the 15 samples constitute the initial population of the orbit inclination parameter $x_1$;

for an orbit height parameter $x_2$, a sampling interval is set to 1, and a total of 1200 sample points are generated; a set of data is taken every 19 sample points as a sample of the initial population, and the 60 samples form the initial population of the orbit inclination parameter $x_2$;

for an initial value parameter $x_3$ of ascending intersection right ascension, a sampling interval is set to 0.001, and a total of 79 sample points are generated; a set of data is taken every four sample points as a sample of the initial population, and the 15 samples constitute the initial population of the orbit inclination parameter $x_3$;

for an initial value parameter $x_4$ of mean anomaly, a sampling interval is set to 0.01, and a total of 30 sample points are generated; a set of data is taken every four sample points as a sample of the initial population, and the six samples constitute the initial population of the orbit inclination parameter $x_4$.

Step 3, calculating fitness of the objective functions of the LEO satellite constellation configuration parameters $x_1$, $x_2$, $x_3$, $x_4$;

After screening and sampling, an initial population with the size of N is generated, and then the rapid non-dominated sorting, selection, crossover, mutation and other operations are performed. The implementation of the algorithm is a process of survival of the fittest similar to the evolutionary theory, and the whole process is also a process of evaluating individual fitness.

In genetic algorithm, the fitness of individuals is used to evaluate the merits of individuals, so fitness function is needed to participate in the evaluation. Appropriate selection method of evolutionary individuals is helpful to improve the efficiency of population evolution.

The method calculates the fitness of an objective function of the LEO satellite constellation parameters $x_1$, $x_2$, $x_3$, $x_4$:

$$\text{Fitness}(F_{VPL}(x)) = \begin{cases} F_{VPL}(x) + C_{min}, & C_{min} + F_{VPL}(x) > 0 \\ 0, & C_{min} + F_{VPL}(x) \le 0 \end{cases},$$

where $C_{min}$ is a preset number, and the minimum function value of the objective function $F_{VPL}(x)$ estimated so far is taken as the objective function, $F_{VPL}(x)$ is an objective function, representing a function where the vertical protection level VPL is the parameter $x_1$, $x_2$, $x_3$ or $x_4$.

As the value of the objective function $F_{VPL}(x)$ meets the requirements only under the requirements of LPV-200, besides the above fitness function, the objective function should also meet the following conditions:

the value of the objective function $F_{VPL}(x)^{F_{VPL}(x)}$ is ≤35 m.

Before checking the fitness function, the requirements for the objective function should be added, and the fitness function can be calculated only after passing the limit value.

Step 4: after screening out an initial population of the parameters $x_1$, $x_2$, $x_3$, $x_4$, starting from a second generation population, merging a parent population and an offspring population to form a new offspring population, and performing fast non-dominated sorting, calculating crowding degrees of individuals in each non-dominated layer, randomly paring the individuals, and performing a crossover operation of a genetic algorithm between the paired two individuals.

According to the embodiment of the present invention, starting from the second generation, the parent population of the previous generation will be merged with the offspring population. As the sample sizes and population numbers of the four parameters are different, the present invention defines the merging ratio of the parent population and the offspring population to form a new offspring population as:

$$pro_i = \frac{\left|\left[\frac{X_{ul} - X_{ll}}{\Delta \pi_i}\right]\right|}{2(N_{interval} + 1)}, i = 1, 2, 3, 4,$$

where $X_{ul}$ is an upper limit of an optimization parameter range, $X_{ll}$ is a lower limit of the optimization parameter range, $\Delta \tau_i$ is an sampling interval of each parameter, and $N_{interval}$ is a sample interval when the initial population is generated.

According to different proportions, and then fast non-dominated sorting is carried out. At the same time, the crowding degree of individuals in each non-dominated layer is calculated, individuals are randomly paired, and cross operations are carried out between the paired two individuals. Usually, the crossover operator and the mutation operator cooperate with each other, and the mutation operator has strong local search ability, which makes the genetic algorithm have both global search ability and local search ability.

5, after the parent population and the offspring population are merged to form the new offspring population, implementing optimal preservation strategy and local optimal selection for the new offspring population, and selecting a maximum value of the objective functions as an optimal offspring, and repeating step 4 until a genetic algebra is less than a maximum genetic algebra.

In the evolution process of genetic algorithm, only individuals with high fitness have a chance to pass on to the next generation, while individuals with low fitness have a smaller probability of passing on to the next generation. This process of survival of the fittest is realized by selecting operators. Combined with the elite strategy, the excellent individual in the parent can enter the offspring and continue to inherit, so as to prevent the loss of Pareto optimal solution.

The optimal preservation strategy commonly used in the prior art can make the individuals with the highest fitness not participate in crossover and mutation, and use it to replace the individuals with the lowest fitness after crossover and mutation. By this method, the individuals with the highest fitness are retained, but this method is not easy to eliminate the local optimal solution of the algorithm, which reduces the global search ability.

In the initial population selection, the sampling interval $\Delta \tau_i$ has been used for sampling, which avoids the local optimum to a certain extent. On this basis, the local mean $A_m^n$ of the sample is introduced for the local optimum selection, where $$A_m^n = \frac{\sum_{5n+1}^{5(n+1)} x_i}{k} \left(n = 0, 1, 2, 3, \ldots, m = 1, 2, 3, \ldots, \left[\left[\frac{X_{ul} - X_{ll}}{\Delta \pi_i}\right]\right]\right),$$

where m represents the $m^{th}$ local mean value, the maximum value is $$\left[\left[\frac{X_{ul} - X_{ll}}{\Delta \pi_i}\right]\right],$$

and $x_i$ represents the $i^{th}$ sample of the corresponding parameter, it is stipulated that the average value of every five samples is taken as the local mean value, $X_{ul}$ is an upper limit of the optimization parameter range, $X_{ll}$ is a lower limit of the optimization parameter range, and $\Delta \tau_i$ is a $X_{ul}$ sampling interval of each parameter.

According to the present invention, a selection threshold $T_{sel}$ is set (determined according to the statistical average of the ARAIM protection level in practical application), after the optimal preservation strategy of the new offspring population is selected, a difference between the objective function and each local mean $A_m^n$ is calculated, if the difference is greater than the selection threshold $T_{sel}$, the local optimal test is passed, and the maximum value of the objective function is taken as the optimal offspring; if the difference is less than the threshold $T_{sel}$, the maximum value near the objective function will be searched as the optimal offspring.

After the maximum value of the objective function is selected as the optimal offspring through local optimal selection, repeat step 4 and cycle until the genetic algebra meets the end condition (less than the maximum algebra, which can be adjusted at any time according to the specific simulation environment). At this time, the vertical protection level reaches the minimum value, and the values of the corresponding optimization parameters $x_1$, $x_2$, $x_3$, $x_4$ are the constellation configuration that makes the protection level of LEO satellite augmentation system the lowest. Using this configuration can ensure the availability while taking into account the economic factors.

According to the present situation of LEO navigation enhancement, the present invention provides a constellation configuration optimization method suitable for LEO satellite navigation enhancement system, and a constellation configuration optimization method based on ARAIM protection level algorithm is proposed by combining the non-dominated sorting genetic algorithm with elite strategy. The ARAIM protection level algorithm optimization is realized from another angle through operations such as abnormal data elimination and parameter sampling, which makes up for the integrity monitoring vacancy of LEO satellite navigation enhancement system and provides reference for future LEO satellite navigation system design and networking.

According to the method, the parameters to be optimized are determined by the ARAIM protection level formula, and the specific observation matrix to be optimized is obtained after the risk values are evenly distributed; Define the constraint range of the optimization parameters in the observation matrix, and optimize the objective function within the constraint range; Before optimization, abnormal data detection and data sampling are carried out to screen the initial population, and when the parent and offspring populations are merged, a specific proportion is adopted to merge them purposefully; Finally, in order to avoid local optimization, the local mean of the sample is defined, and the optimized value and the local mean are threshold-tested, so as to achieve the goal of global optimization.

Combined with the description and practice of the present invention disclosed here, other embodiments of the present invention will be easy to think of and understand by those skilled in the art. The true scope and gist of the present invention are defined by the claims.

What is claimed is:

1. A constellation configuration optimization method of a low earth orbit (LEO) satellite augmentation system for an ARAIM application, comprising the following steps:
   1, traversing vertical protection levels after all subset solutions and fault modes under the condition that integrity risk and continuity risk are equally distributed, and determining the constraint conditions of LEO satellite constellation configuration parameters;
   2, determining objective functions of LEO satellite constellation configuration parameters $x_1$, $x_2$, $x_3$, $x_4$, eliminating calculated values of abnormal vertical protection levels, and screening initial populations of the parameters $x_1$, $x_2$, $x_3$, $x_4$;
   3, calculating fitness of the objective functions of the LEO satellite constellation configuration parameters $x_1$, $x_2$, $x_3$, $x_4$;
   4, after screening out an initial population of the parameters $x_1$, $x_2$, $x_3$, $x_4$, starting from a second generation population, merging a parent population and an offspring population to form a new offspring population, and performing fast non-dominated sorting, calculating crowding degrees of individuals in each non-dominated layer, randomly paring the individuals, and performing a crossover operation of a genetic algorithm between the paired two individuals;
   5, after the parent population and the offspring population are merged to form the new offspring population, implementing optimal preservation strategy and local optimal selection for the new offspring population, and selecting a maximum value of the objective functions as an optimal offspring, and repeating step 4 until a genetic algebra is less than a maximum genetic algebra.

2. The method according to claim 1, wherein the vertical protection level in step 1 is expressed as:
   $VPL_q = \max((VPL_0)_q, \max((VPL_i)_q))$, where $VPL_0$ is a vertical protection level under a fault-free condition, $(VPL_0)_q = K_{MD,q}^0 \cdot \sigma_{0,q} + \Sigma_{n=1}^{Nsat} |S_{q,n}^0| \cdot b_{int,n}$, $K_{MD,q}^0$ is an integrity and continuity risk value of the fault-free mode under a fully visible satellite subset, $S_{q,n}^0$ is a projection matrix, and $b_{int,n}$ is a maximum nominal deviation of a $n^{th}$ satellite;
   $VPL_i$ is a vertical protection level corresponding to a measurement deviation of an $i^{th}$ fault mode where a maximum deviation is not exceeded, $(VPL_i)_q = K_{MD,q}^i \cdot \sigma_{i,q} + \Sigma_{n=1}^{Nsat} |S_{q,n}^i| \cdot b_{int,n} + D_{i,q}$, $D_{i,q}$ is a detection threshold;
   wherein, $\sigma_{0,q} = \sqrt{(GW_{INT}G^T)_{q,q}^{-1}}$, $\sigma_{i,q} = \sqrt{(G^T M_i W_{INT} G^T)_{q,q}^{-1}}$, G is a geometric matrix in a pseudo-range observation equation, $W_{INT}$ is a parameter of a fixed error hypothesis model related to integrity, $M_i$ is an identity matrix of a size $N_{sat}*N_{sat}$, $N_{sat}$ is the number of visible satellites, and q is a $q^{th}$ sample point;
   the geometric matrix G in the pseudo-range observation equation contains the LEO satellite constellation configuration parameters $x_1$, $x_2$, $x_3$, $x_4$;
   the constraint conditions of the LEO satellite constellation configuration parameters are expressed as:

$$\begin{bmatrix} N_0 & 0 \\ N_C & N_{SO} \end{bmatrix} \begin{bmatrix} \Omega_{ij} & \Omega_{11} \\ M_{ij} & M_{11} \end{bmatrix} = 2\pi \begin{bmatrix} i & -1 \\ j & -1 \end{bmatrix},$$

where 1 $N_0$ is the number of orbital planes of LEO constellation, $N_{SO}$ is the number of satellites on each orbital plane, $N_C$ is a phase parameter, $N_C \in [1, N_0]$. $\Omega$ is a right ascension of an ascending intersection point, M is an average anomaly, where i represents an $i^{th}$ orbital plane and j represents $j^{th}$ satellite.

3. The method according to claim 1, wherein the objective functions of the LEO satellite constellation configuration parameters $x_1$, $x_2$, $x_3$, $x_4$ in step 2 are expressed as:

$$\begin{cases} \min[-F_{VPL}(x_1)] \\ \text{s.t. } 0 \leq x_1 \leq \frac{\pi}{2} \end{cases},$$

$$\begin{cases} \min[-F_{VPL}(x_2)] \\ \text{s.t. } 800 \leq x_2 \leq 2000 \end{cases},$$

$$\begin{cases} \min[-F_{VPL}(x_3)] \\ \text{s.t. } 0 \leq x_3 \leq 0.782 \end{cases},$$

$$\begin{cases} \min[-F_{VPL}(x_4)] \\ \text{s.t. } 0 \leq x_4 \leq 0.3 \end{cases}$$

wherein, $F_{VPL}(x_1)$ is a function where a vertical protection level VPL is the parameter $x_1$, $F_{VPL}(x_2)$ is a function where a vertical protection level VPL is the parameter $x_2$, $F_{VPL}(x_3)$ is a function where a vertical protection level VPL is the parameter $x_3$, and $F_{VPL}(x_4)$ is a function where a vertical protection level VPL is the parameter $x_4$.

4. The method according to claim 1, wherein in step 2, the calculated values of abnormal vertical protection levels are eliminated by the following method:
   initial anomaly detection thresholds are set to $T_{first}^+$, $T_{first}^-$, and $T_{first}^+ = \mu_{all} + 2\sigma_{all}$, $T_{first}^- = \mu_{all} - 2\sigma_{all}$ is defined, where
   $\mu_{all}$ is an average value of VPL calculated values of vertical protection levels corresponding to all sample points, and $\sigma_{all}$ is a standard deviation of vertical protection and VPL calculated values corresponding to all sample points,
   the calculated value of the vertical protection level VPL of each sample point is compared with $T_{first}^+$, $T_{first}^-$, and if the inequality $T_{first}^+ \leq VPL \leq T_{first}^-$ is satisfied, the sample point passes the threshold detection and waits for the initial population screening; if the inequality $T_{first}^+ \leq VPL \leq T_{first}^-$ is not satisfied, the sample point fails the threshold detection and is stored in a abnormal data module.

5. The method according to claim 1, wherein in step 2, the initial population screening is carried out by the following method:
   for an orbit inclination parameter $x_1$, a sampling interval is set to 0.01, and a total of 158 sample points are generated; a set of data is taken every 9 sample points as a sample of the initial population, and the 15 samples constitute the initial population of the orbit inclination parameter $x_1$;

for an orbit height parameter $x_2$, a sampling interval is set to 1, and a total of 1200 sample points are generated; a set of data is taken every 19 sample points as a sample of the initial population, and the 60 samples form the initial population of the orbit inclination parameter $x_2$;

for an initial value parameter $x_3$ of ascending intersection right ascension, a sampling interval is set to 0.001, and a total of 79 sample points are generated; a set of data is taken every four sample points as a sample of the initial population, and the 15 samples constitute the initial population of the orbit inclination parameter $x_3$;

for an initial value parameter $x_4$ of mean anomaly, a sampling interval is set to 0.01, and a total of 30 sample points are generated; a set of data is taken every four sample points as a sample of the initial population, and the six samples constitute the initial population of the orbit inclination parameter $x_4$.

6. The method according to claim 1, wherein in step 3, the fitness of the objective functions of the LEO satellite constellation configuration parameters $x_1, x_2, x_3, x_4$ is calculated by the following method:

a maximum optimization problem function is adopted for a fitness function:

$$\text{Fitness}(F_{VPL}(x)) = \begin{cases} F_{VPL}(x) + C_{min}, & C_{min} + F_{VPL}(x) > 0 \\ 0, & C_{min} + F_{VPL}(x) \le 0 \end{cases},$$

where $C_{min}$ is a preset number, and the minimum function value of the objective function $F_{VPL}(x)$ estimated so far is taken as the objective function, $F_{VPL}(x)$ is an objective function, representing a function where the vertical protection level VPL is the parameter $x_1, x_2, x_3, x_4$.

7. The method according to claim 6, wherein the objective function should also satisfy the following conditions:

the value of the objective function is ≤35 m.

8. The method according to claim 1, wherein the merging ratio of the parent population and the offspring population to form the new offspring population is:

$$pro_i = \frac{\left|\frac{X_{ul} - X_{ll}}{\Delta \pi_i}\right|}{2(N_{interval} + 1)}, i = 1, 2, 3, 4,$$

where $X_{ul}$ is an upper limit of an optimization parameter range, $X_{ll}$ is a lower limit of the optimization parameter range, $\Delta \tau_i$ is an sampling interval of each parameter, and $N_{interval}$ is a sample interval when the initial population is generated.

9. The method according to claim 1, wherein in step 5, a local mean $A_m^n$ of the sample is introduced for local optimal selection, a selection threshold $T_{sel}$ is set, and after performing the optimal preservation strategy selection for the new offspring population, a difference between the objective function and each local mean $A_m^n$ is calculated, if the difference is greater than the selection threshold $T_{sel}$, the local optimal test is passed, and the maximum value of the objective function is taken as the optimal offspring; if the difference is less than the threshold $T_{sel}$, the maximum value near the objective function will be searched as the optimal offspring.

10. The method according to claim 9, wherein the local mean $A_m^n$ of the sample is expressed as:

$$A_m^n = \frac{\sum_{5n+1}^{5(n+1)} x_i}{k}\left(n = 0, 1, 2, 3, \ldots, m = 1, 2, 3, \ldots, \left[\frac{\left[\frac{X_{ul} - X_{ll}}{\Delta \pi_i}\right]}{5}\right]\right),$$

where m represents the $m^{th}$ local mean value, the maximum value is $$\left[\frac{\left[\frac{X_{ul} - X_{ll}}{\Delta \pi_i}\right]}{5}\right],$$

and $x_i$ represents the $i^{th}$ sample of the corresponding parameter, it is stipulated that the average value of every five samples is taken as the local mean value, $X_{ul}$, is an upper limit of the optimization parameter range, $X_{ll}$ is a lower limit of the optimization parameter range, and $\Delta \tau_i$ is a $X_{ul}$ sampling interval of each parameter.

* * * * *